United States Patent
Lee et al.

(10) Patent No.: US 9,908,786 B2
(45) Date of Patent: Mar. 6, 2018

(54) CATHODE ACTIVE MATERIAL, METHOD FOR PREPARING THE SAME, AND LITHIUM SECONDARY BATTERIES INCLUDING THE SAME

(71) Applicant: Samsung SDI Co., Ltd., Yongin-si, Gyeonggi-do (KR)

(72) Inventors: Misun Lee, Chungcheongnam-do (KR); Jongseok Moon, Chungcheongnam-do (KR); Taehyeon Kim, Gyeonggi-do (KR); Shin Jung Choi, Chungcheongnam-do (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 547 days.

(21) Appl. No.: 14/084,092

(22) Filed: Nov. 19, 2013

(65) Prior Publication Data
US 2014/0141331 A1    May 22, 2014

(30) Foreign Application Priority Data
Nov. 22, 2012    (KR) ........................ 10-2012-0133278

(51) Int. Cl.
| | |
|---|---|
| *H01M 4/36* | (2006.01) |
| *C01D 15/02* | (2006.01) |
| *H01M 4/505* | (2010.01) |
| *H01M 4/525* | (2010.01) |
| *H01M 10/052* | (2010.01) |
| *C01G 45/12* | (2006.01) |
| *C01G 53/00* | (2006.01) |

(52) U.S. Cl.
CPC ......... *C01D 15/02* (2013.01); *C01G 45/1257* (2013.01); *C01G 53/006* (2013.01); *C01G 53/50* (2013.01); *H01M 4/364* (2013.01); *H01M 4/505* (2013.01); *H01M 4/525* (2013.01); *H01M 10/052* (2013.01); *C01P 2002/50* (2013.01); *C01P 2002/52* (2013.01); *Y02T 10/7011* (2013.01)

(58) Field of Classification Search
None
See application file for complete search history.

(56) References Cited

U.S. PATENT DOCUMENTS

| | | | | |
|---|---|---|---|---|
| 2004/0091779 A1* | 5/2004 | Kang | ................... | C01G 53/006 429/231.1 |
| 2010/0086853 A1* | 4/2010 | Venkatachalam | ... | H01M 4/1391 429/223 |
| 2010/0086854 A1* | 4/2010 | Kumar | .................. | H01M 4/505 429/223 |
| 2013/0168599 A1 | 7/2013 | Kato et al. | | |

FOREIGN PATENT DOCUMENTS

| | | |
|---|---|---|
| JP | 2012-38562 A | 2/2012 |
| KR | 1020090006897 A | 1/2009 |
| KR | 20100042145 A | 4/2010 |

OTHER PUBLICATIONS

Jarvis, et al. Atomic Structure of a Lithium-Rich Layered Oxide Material for Lithium-Ion Batteries: Evidence of a Solid Solution. Jul. 2011. Chemistry of Materials. 23 (16), pp. 3614-3621.*
Jiang, et al. Hollow 0.3Li2MnO3·0.7LiNi0.5Mn0.5O2 microspheres as a high-performance cathode material for lithium-ion batteries. Jan. 3, 2013. Phys.Chem. Chem. Phys., 15, 2954-2960.*
Karan. Structural and Electrochemical Studies of Chemical Solution Derived xLiMn2O3-(1-x)Li[Mn0.5Ni0.5]O2 Cathodes. Meet. Abstr. Oct. 2008 MA2008-02(12): 1146.*
Doeff. Batteries for Sustainability. Selected entries from the Encyclopedia of Sustainability Sience and Technology. Chapter 2: Battery Cathodes. 2013. pp. 13.*
Wikipedia—Full width at half maximum. https://en.wikipedia.org/wiki/Full_width_at_half_maximum. Retrieved Aug. 10, 2016.*
Office Action issued in corresponding Korean Application No. 10-2012-0133278 with English translation thereof dated Mar. 31, 2014 (13 pages).
PBFC-2 2nd International Conference on Polymer Batteries and Fuel Cells, Abstract #57 (1 page).
Kang, S.-H. et al. Layered Li (Li0.2Ni0.15 +0.5zCo0.10Mn0.55-0.5z)O2-zFz cathode materials for Li-ion secondary batteries, dated May 25, 2005 (4 pages).
Kang, S.-H. et al. Effect of fluorine on electrochemical properties of layered Li(Ni0.5Mn0.5)O2 cathode materials, dated May 25, 2005 (4 pages).
Extended European Search Report issued in corresponding European Application No. 13005458.8 dated Jul. 9, 2014 (16 pages).
Karalee A. Jarvis et al., Atomic Structure of a Lithium-Rich Layered Oxide Material for Lithium-Ion Batteries: Evidence of a Solid Solution, Chemistry of Materials, vol. 23, No. 16, Aug. 23, 2011, p. 3614-3621 (8 pages).
Michael M. Thackeray et al., Li2MnO3—stabilized LiMO2 (M =Mn, Ni, Co) electrodes for lithium-ion batteries, Journal of Materials Chemistry, vol. 17, No. 30, Aug. 14, 2007, p. 3112-3125 (15 pages).
Japanese Office Action dated Sep. 5, 2017 in the examination of the Japanese Patent Application No. 2013-238647.

* cited by examiner

*Primary Examiner* — Sarah A Slifka
*Assistant Examiner* — Haroon S Sheikh
(74) *Attorney, Agent, or Firm* — Lee & Morse, P.C.

(57) ABSTRACT

The present invention relates to a cathode active material for a lithium secondary battery, a method for preparing the same, and a lithium secondary battery including the same. Provided is a cathode active material composed of a lithium-excess lithium metal composite compound including $Li_2MnO_3$ having a layered structure, and doped with a fluoro compound, wherein an FWHM (half value width) value is within a range from 0.164 degree to 0.185 degree.

8 Claims, No Drawings

CATHODE ACTIVE MATERIAL, METHOD FOR PREPARING THE SAME, AND LITHIUM SECONDARY BATTERIES INCLUDING THE SAME

CROSS-REFERENCE TO RELATED APPLICATIONS

This application claims priority to and the benefit of Korean Patent Application No. 10-2012-0133278 filed in the Korean Intellectual Property Office on Nov. 22, 2012, the entire contents of which are incorporated herein by reference.

TECHNICAL FIELD

The present invention relates to a cathode active material for a lithium secondary battery, a method for preparing the same, and a lithium secondary battery including the same, and more particularly, to the preparation of a cathode active material showing a lifespan characteristic of 90% or more and a rate capability of 80% or more while being capable of exhibiting a high capacity by doping a lithium metal composite oxide including $Li_2MnO_3$ having a layered structure containing lithium in excess with a fluoro compound and firing the oxide at low temperature.

BACKGROUND ART

As the IT technology is gradually developing, the battery capacity and life of a lithium ion secondary battery are also developing together, but the development may be a kind of development in cell design based on LCO which is an existing material.

However, high capacity batteries which have been developed based on a cell design also show limitation in capacity to be used in recent smart devices and electric vehicles and the like. Therefore, there is a need for a new lithium secondary battery material. The capacity of a secondary battery significantly depends on a cathode active material, and therefore, recently, studies have been conducted on lithium metal composite compounds containing $Li_2MnO_3$ having a layered structure containing lithium in excess.

High capacity NCM-based cathode active materials having an $Li_2MnO_3$—$LiMO_2$ (M is Ni, Co, or Mn) mixed structure, which have been recently highlighted, may exhibit higher capacity than existing cathode active materials, and may be used under high voltage, and therefore, it is possible to prepare a lithium ion secondary battery having a high energy density when the material is used.

However, cathode active materials having a layered structure including $Li_2MnO_3$ are structurally unstable after lithium deintercalation, and thus show deterioration in a lifespan characteristic, and have a problem in that it is difficult for the materials to be adopted in electric vehicles and the like due to deterioration in high rate capability caused by an increase in resistance (impedance) during charge and discharge.

In compounds represented by Formula $Li_{1+\alpha}Ni_xCo_yMn_zO_2$, compounds with $\alpha \leq 0.1$ are materials in which the amount of $Li_2MnO_3$ is less than 20%, and are materials in which $Li_2MnO_3$ is present in a very small amount, or correspond to existing NCM-based materials. In this case, a capacity in a high voltage region is 200 mAh/s or more and a rate capability is 85% or more, which are very high. However, lifespan characteristic at high voltage is very low.

Meanwhile, materials with $0.1 < \alpha \leq 1$, which are an object in the present patent, are materials in which the amount of $Li_2MnO_3$ is 20% or more, and $Li_2MnO_3$ is a material which participates in charge and discharge at 4.5 V or more and has been highlighted as a cathode material for an electric vehicle and the like by increasing capacity and lifespan characteristics at high voltage. However, there is a problem in that rate capability deteriorates due to low electrical conductivity of $Li_2MnO_3$.

Until now, normal cathode active materials (including $0.1 < \alpha \leq 1$) have been sintered in a temperature range from 800° C. to 950° C. in order to simultaneously secure capacity and lifespan characteristics.

When firing is performed at 800° C. or less, for example, at a low temperature such as 700° C., the capacity is increased to 240 mAh/g or more, but a lifespan characteristic and a rate capability are significantly reduced by approximately 70% due to reduced crystallinity. Accordingly, it is very difficult at the current technical level to prepare a cathode active material which is capable of exhibiting high capacity, and simultaneously shows a lifespan characteristic of 90% or more and a rate capability of 80% or more.

Meanwhile, Patent Document 1 proposes a cathode active material including a lithium manganese oxide represented by Formula $Li_2MnO_{3-x}A_x$ (here, A is an element having an oxidation number of −1 and a halogen atom such as fluorine and chlorine, or a transition metal element, and $0<x<1$) in an amount of 50% or more based on the total weight of the cathode active material, by partially substituting an oxygen element in $Li_2MnO_3$ which is inexpensive and excellent in structural stability with an element with a −1 valence.

However, Patent Document 1 only discloses "since a lithium manganese oxide of Formula 1 according to the present invention may be prepared by, for example, a method including mixing 'a lithium compound' as a lithium supply source, 'a manganese compound' as a manganese supply source, and 'a metal compound containing A' as a doping element supply source in a predetermined content range and subjecting the mixture to heat treatment, and the lithium compound, the manganese compound, the metal compound containing A and the like are known in the art, the description thereof will be omitted in the present specification.", but does not disclose a method for preparing such a cathode active material, basic characteristic conditions of a cathode active material prepared by the method at all.

CITATION LIST

Patent Document

Patent Document 1: KR10-2009-0006897 A

SUMMARY OF THE INVENTION

The present invention has been made in an effort to provide a cathode active material which is capable of exhibiting high capacity and simultaneously shows a lifespan characteristic of 90% or more and a rate capability of 80% or more by doping a lithium-excess lithium metal composite compound containing $Li_2MnO_3$ having a layered structure with an appropriate amount of fluoro compound and firing the compound at low temperature.

Further, it is an object to provide a method for preparing the cathode active material and a secondary battery including the same.

In order to solve the aforementioned problems, the present invention provides the following exemplary embodiments.

In an exemplary embodiment, the present invention provides a cathode active material composed of a lithium-excess lithium metal composite compound including $Li_2MnO_3$ having a layered structure and doped with a fluoro compound, in which an FWHM (half value width) value is within a range from 0.164 degree to 0.185 degree.

Here, the FWHM (full width at half maximum) means a half value width. The value is related to crystallinity, and the lower the value is, the higher the crystallinity is.

In the exemplary embodiment, the length of the c-axis in the cathode active material is within a range from 14.241 Å to 14.2429 Å.

The present inventors have found that lifespan may be increased by doping an appropriate amount of a fluoro compound and controlling the crystallinity (FWHM value) of a cathode active material to be in the range even though firing is performed at a temperature of 800° C. or less, at which it is known that an appropriate capacity of 240 mAh/g or more may be obtained, but life and a rate capability significantly deteriorate, and that the rate capability may be enhanced by increasing the length of the c-axis of the cathode active material so as to be in the range and facilitating the movement of lithium, thereby reaching the present invention.

When the values are out of the range, enhanced life and rate capability may not be simultaneously satisfied, which is not preferred.

In the exemplary embodiment, the lithium metal composite compound may be a lithium-excess lithium metal composite compound, which includes $Li_2MnO_3$ having a layered structure and is represented by Formula $Li_{1+\alpha}Ni_xCo_yMn_2O_2$ (here, $0.1<\alpha\leq1$ and $0<x+y+z\leq1$), and may have a mixed structure of a rhombohedral $LiMO_2$ (here, M is one or more metals selected from the group consisting of Ni, Co and Mn) and a monoclinic $Li_2MnO_3$.

The lithium metal composite compound may include $Li_2MnO_3$ in an amount of 20% or more, preferably 40% or more.

The lithium metal composite compound is a compound having a layered structure, in which a transition metal layer—an oxygen layer—a lithium ion layer—an oxygen layer—a transition metal layer are sequentially repeated. In this case, the lithium metal composite compound is composed of a domain in which a part of lithium is present in the transition metal layer and a domain in which lithium ions are not present in the transition metal layer, and a part of oxygen is substituted with a fluoro group by doping of a fluoro compound.

The fluoro compound may be one selected from the group consisting of LiF, NaF, KF, $MgF_2$, $CaF_2$, $CuF_2$, $CdF_2$, $FeF_2$, $MnF_2$, $MgF_2$, $NiF_2$, $PbF_2$, $SnF_2$, $SrF_2$, $XeF_2$, $ZnF_2$, $AlF_3$, $BF_3$, $BiF_3$, $CeF_3$, $CrF_3$, $FeF_3$, $InF_3$, $LaF_3$, $MnF_3$, $NdF_3$, $VOF_3$, $YF_3$, $CeF_4$, $GeF_4$, $HfF_4$, $SiF_4$, $SnF_4$, $TiF_4$, $VF_4$, $ZrF_4$, $VF_5$, $NbF_5$, $SbF_5$, $TaF_5$, $BiF_5$, $MoF_6$, $ReF_6$, $SF_6$, $WF_6$, $NH_4F$, or a mixture thereof, and the cathode active material may be doped with the fluoro compound at 0.02 to 0.06 mol.

When the amount of the fluoro compound added is less than 0.02 mol, a rate capability and a lifespan characteristic deteriorate, and when the amount is more than 0.06 mol, a rate capability is decreased, which are not preferred.

In another exemplary embodiment, the present invention provides a method for preparing a cathode active material composed of a lithium-excess lithium metal composite compound including $Li_2MnO_3$ having a layered structure, in which an FWHM (half value width) value is within a range from 0.164 degree to 0.185 degree, the method including: synthesizing a transition metal compound precursor; and mixing the transition metal compound precursor, a lithium supply source, and a fluoro compound, and then subjecting the mixture to heat treatment at 800° C. or less.

The lithium metal composite compound may be a lithium-excess lithium metal composite compound represented by Formula $Li_{1+\alpha}Ni_xCo_yMn_xO_2$ (here, $0.1<\alpha\leq1$ and $0<x+y+z\leq1$), and may include $Li_2MnO_3$ in an amount of preferably 20% or more, and more preferably 40% or more.

The lithium metal composite compound having the composition may be prepared by synthesizing a transition metal hydroxide precursor in the form of a hydroxide, mixing the synthesized transition metal hydroxide precursor, $Li_2CO_3$ or LiOH as a lithium supply source, LiF as a fluoro compound, and the like and then subjecting the mixture to heat treatment at 800° C. or less.

In order to synthesize a precursor in the form of a transition metal hydroxide, an aqueous solution is prepared by dissolving one of nickel sulfate, nickel nitrate, and nickel carbonate in the form of a salt which is dissolved in water; one of cobalt sulfate, cobalt nitrate, and cobalt carbonate; and one of manganese sulfate, manganese nitrate, and manganese carbonate at a constant molar concentration, and then is precipitated in the form of a hydroxide at a pH of 10 or more using a base such as NaOH, $NH_4OH$, and KOH.

In this case, when the pH is less than 10, the particle aggregation rate is larger than the nucleus production rate of particles, and thus the size of particles grows to 3 μm or more, and when the pH is more than 12, the nucleus production rate of particles is larger than the particle aggregation rate, and thus particles are not aggregated, thereby making it difficult to obtain a transition metal hydroxide in which each component of Ni, Co, and Mn is homogenously mixed. Accordingly, it is preferred that the transition metal compound precursor is synthesized at a pH from 10 to 12.

$SO_4^{2-}$, $NH_4^+$, $NO_3^-$, $Na^+$, $K^+$ and the like which are adsorbed on the surface of the thus precipitated powder are washed several times using distilled water, thereby synthesizing a high-purity transition metal hydroxide precursor. The thus synthesized transition metal hydroxide precursor is dried in an oven at 150° C. for 24 hours or more so as to have a moisture content of 0.1 wt % or less.

It is preferred that the thus prepared transition metal compound precursor is in the form of a transition metal hydroxide represented by Formula $Ni_aCo_bMn_c(OH)_2$ ($0<a<0.4$, $0<b\leq0.7$, $0<c\leq0.7$, $a+b+c=1$, and $a<b$).

It is possible to prepare a lithium metal composite compound by homogeneously mixing the completely dried transition metal hydroxide precursor, $Li_2CO_3$ or LiOH as a lithium supply source, and a fluoro compound, and then subjecting the mixture to heat treatment at 800° C. or less, preferably 700° C. for 5 to 24 hours.

In this case, the cathode active material is doped with a fluoro compound and subjected to heat treatment such that a rate capability and a lifespan characteristic of the cathode active material are secured, and $Li_2MnO3$ having a layered structure and $LiNi_aCo_bMn_c(OH)_2$ ($a+b+c=1$) having a layered structure may be in the solid-molten state as an atomic unit in a primary particle even at a low temperature of 800° C. or less.

The fluoro compound may be one selected from the group consisting of LiF, NaF, KF, $MgF_2$, $CaF_2$, $CuF_2$, $CdF_2$, $FeF_2$, $MnF_2$, $MgF_2$, $NiF_2$, $PbF_2$, $SnF_2$, $SrF_2$, $XeF_2$, $ZnF_2$, $AlF_3$, $BF_3$, $BiF_3$, $CeF_3$, $CrF_3$, $FeF_3$, $InF_3$, $LaF_3$, $MnF_3$, $NdF_3$, $VOF_3$, $YF_3$, $CeF_4$, $GeF_4$, $HfF_4$, $SiF_4$, $SnF_4$, $TiF_4$, $VF_4$, $ZrF_4$, $VF_5$, $NbF_5$, $SbF_5$, $TaF_5$, $BiF_5$, $MoF_6$, $ReF_6$, $SF_6$, $WF_6$, $NH_4F$, or a mixture thereof, and the cathode active material may be doped with the fluoro compound at 0.02 to 0.06 mol.

In yet another exemplary embodiment, the present invention provides a lithium secondary battery including a cathode including the cathode active material; an anode including an anode active material; and an electrolyte present between the cathode and the anode.

Since it is possible to provide a cathode active material which simultaneously shows a lifespan characteristic of 90% or more and a rate capability of 80% or more while being capable of exhibiting high capacity by doping the cathode active material prepared as the present invention with an appropriate amount of a fluoro compound, and firing the cathode active material at low temperature, the cathode active material may be used in a high-capacity lithium secondary battery.

DETAILED DESCRIPTION

<Cathode Active Material>

A cathode active material of the present invention is composed of a lithium-excess lithium metal composite compound including $Li_2MnO_3$ having a layered structure and doped with a fluoro compound, in which an FWHM (half value width) value is within a range from 0.164 degree to 0.185 degree. Furthermore, the length of the c-axis in the cathode active material is within a range from 14.241 Å to 14.2429 Å.

The lithium metal composite compound is a lithium-excess lithium metal composite compound including $Li_2MnO_3$ having a layered structure, preferably a lithium-excess lithium metal composite compound represented by Formula $Li_{1+\alpha}Ni_xCo_yMn_zO_2$ (here, $0.1<\alpha\leq1$ and $0<x+y+z\leq1$), and has a mixed structure of a rhombohedral $LiMO_2$ (here, M is Ni, Co and Mn) and a monoclinic $Li_2MnO_3$.

The cathode active material includes $Li_2MnO_3$ in an amount of 20% or more, preferably 40% or more.

The fluoro compound is LiF, and the cathode active material is doped with the fluoro compound at 0.02 to 0.06 mol.

The aforementioned cathode active material according to the present invention is prepared by the following preparation method.

<Preparation Method of Cathode Active Material>

The cathode active material according to the present invention is prepared by a method for preparing a cathode active material composed of a lithium-excess lithium metal composite compound including $Li_2MnO_3$ having a layered structure, in which an FWHM (half value width) value is within a range from 0.164 degree to 0.185 degree, the method including: synthesizing a transition metal compound precursor; and mixing the transition metal compound precursor, a lithium supply source, and a fluoro compound, and then subjecting the mixture to heat treatment at 800° C. or less.

The lithium metal composite compound is a lithium-excess lithium metal composite oxide represented by Formula $Li_{1+\alpha}Ni_xCo_yMn_zO_2$ (here, $0.1<\alpha\leq1$ and $0<x+y+z\leq1$).

The cathode active material may be prepared by synthesizing a transition metal hydroxide precursor in the form of a hydroxide, mixing $Li_2CO_3$ or LiOH as a lithium supply source and LiF as a fluoro compound, and then subjecting the mixture to heat treatment at 800° C. or less for 5 to 24 hours.

The transition metal compound precursor is synthesized in a pH from 10 to 12, and is in the form of a transition metal hydroxide represented by Formula $Ni_aCo_bMn_c(0<a<0.4, 0<b\leq0.7, 0<c\leq0.7, a+b+c=1,$ and $a<b)$.

A lithium metal composite compound is prepared by homogeneously mixing the completely dried transition metal hydroxide precursor, $Li_2CO_3$ as a lithium supply source, 0.02 to 0.06 mol of LiF as a fluoro compound and then subjecting the mixture to heat treatment at 700° C. for 10 hours.

<Lithium Secondary Battery Including Cathode Active Material>

Since the cathode active material according to the present invention may be utilized as a cathode material for a lithium secondary battery, has the same structure as a well-known secondary battery except for the cathode active material composition, the crystal structure and the like, and may be prepared by the same well-known preparation method, the detailed description thereof will be omitted.

Hereinafter, with reference to accompanying drawings, a method for preparing the cathode active material according to the present invention and a lithium secondary battery including the cathode active material prepared by the method will be described in detail through preferred Examples and Comparative Examples. However, these Examples are only a preferred Example of the present invention, and it should not be interpreted that the present invention is limited by the Examples.

Example 1

(1) Synthesis of Transition Metal Hydroxide Precursor

A transition metal mixed solution is prepared such that the molar ratio of Ni:Co:Mn is a composition of 2:2:6. The thus prepared transition metal mixed solution has a pH of 5, and is injected into a continuous reactor which is controlled at a pH of 11 at a constant rate. In this case, the pH is maintained to be 11 using $NH_4OH$ and NaOH, and the reaction time is controlled such that the solution stays in the continuous reactor for approximately 10 hours. In this case, the reactor temperature is controlled to 40° C., and N2 gas is injected into the reactor such that a transition metal hydroxide precipitate is not oxidized. In order to remove aqueous ions which are adsorbed on the surface of the thus synthesized transition metal hydroxide powder, a transition metal hydroxide precursor is obtained by repeatedly performing washing using distilled water, and filtering the powder using a filter paper, and then drying the filtered powder in an oven at 150° C. The composition of the transition metal hydroxide precursor may be represented by Formula $Ni_aCo_bMn_c(OH)_2$ $(0<a<0.4, 0<b\leq0.7, 0<c\leq0.7, a+b+c=1,$ and $a<b)$.

(2) Synthesis of Cathode Active Material

A lithium metal composite oxide powder is obtained by weighing the transition metal hydroxide precursor synthesized in (1), $Li_2CO_3$ as a lithium supply source, and LiF as a fluoro compound as the contents in the following Table 1, mixing the mixture with a mixer for 5 minutes, and then firing the resulting mixture at 700° C. for 10 hours.

(3) Evaluation of Battery Characteristics

In order to evaluate the rate capability, the lifespan characteristic and the like, an electrode is manufactured by mixing the cathode active material synthesized in (2), Denka Black as a conductive material, and polyvinylidene fluoride (PVDF) as a binder with an appropriate amount of NMP, casting the mixture on an aluminum (Al) thin plate when an appropriate viscosity is obtained, drying the cast in a vacuum oven at 120° C. for 1 hour, and then rolling the cast.

A coin battery conforming to the CR2032 standard is manufactured by adopting a lithium foil as an anode and a porous polyethylene film as a separation film, and using an electrolyte including LiPF6, and the results measured for the following items are shown in the following Table 1.

High rate capability: (discharge capacity at 3C/discharge capacity at 0.33C)*100, at 2.5 V to 4.6 V Lifespan characteristic: (discharge capacity after charge and discharge 50 times/initial discharge capacity) 100, performing charge and discharge (at 1C and 25° C.), at 2.5 V to 4.6 V.

Example 2

A lithium metal composite oxide powder is obtained by weighing the transition metal hydroxide precursor, $Li_2CO_3$ as a lithium supply source, and LiF as a fluoro compound, which are the same as in Example 1 as the contents in the following Table 1, mixing the mixture with a mixer for 5 minutes, and firing the resulting mixture at 700° C. for 10 hours, and the results obtained by measuring the mixture in the same manner as in Example 1 are shown in the following Table 1.

Example 3

A lithium metal composite oxide powder is obtained by weighing the transition metal hydroxide precursor, $Li_2CO_3$ as a lithium supply source, and LiF as a fluoro compound, which are the same as in Example 1 as the contents in the following Table 1, mixing the mixture with a mixer for 5 minutes, and firing the resulting mixture at 700° C. for 10 hours, and the results obtained by measuring the mixture in the same manner as in Example 1 are shown in the following Table 1.

Comparative Example 1

A lithium metal composite oxide powder is obtained by weighing the transition metal hydroxide precursor which is the same as in Example 1 and $Li_2CO_3$ as a lithium supply source as the contents in the following Table 1, mixing the mixture with a mixer for 5 minutes, and firing the resulting mixture at 700° C. for 10 hours, and the results obtained by measuring the mixture in the same manner as in Example 1 are shown in the following Table 1.

Comparative Example 2

A lithium metal composite oxide powder is obtained by weighing the transition metal hydroxide precursor, $Li_2CO_3$ as a lithium supply source, and LiF as a fluoro compound, which are the same as in Example 1 as the contents in the following Table 1, mixing the mixture with a mixer for 5 minutes, and firing the resulting mixture at 700° C. for 10 hours, and the results obtained by measuring the mixture in the same manner as in Example 1 are shown in the following Table 1.

Comparative Example 3

A lithium metal composite oxide powder is obtained by weighing the transition metal hydroxide precursor which, $Li_2CO_3$ as a lithium supply source, and LiF as a fluoro compound, which are the same as in Example 1 as the contents in the following Table 1, mixing the mixture with a mixer for 5 minutes, and firing the resulting mixture at 700° C. for 10 hours, and the results obtained by measuring the mixture in the same manner as in Example 1 are shown in the following Table 1.

Comparative Example 4

A lithium metal composite oxide powder is obtained by weighing the transition metal hydroxide precursor which is the same as in Example 1, $Li_2CO_3$ as a lithium supply source, and LiF as a fluoro compound as the contents in the following Table 1, mixing the mixture with a mixer for 5 minutes, and firing the resulting mixture at 700° C. for 10 hours, and the results obtained by measuring the mixture in the same manner as in Example 1 are shown in the following Table 1.

TABLE 1

|  | Comparative Example 1 | Comparative Example 2 | Example 1 | Example 2 | Example 3 | Comparative Example 3 | Comparative Example 4 |
|---|---|---|---|---|---|---|---|
| Firing temperature |  |  |  | 700° C. |  |  |  |
| Time |  |  |  | 10 hr |  |  |  |
| Precursor mol | 0.82 | 0.82 | 0.82 | 0.82 | 0.82 | 0.82 | 0.82 |
| $Li_2CO_3$ | 1.18 | 1.17 | 1.16 | 1.13 | 1.12 | 1.11 | 1.06 |
| LiF | 0.00 | 0.01 | 0.02 | 0.05 | 0.06 | 0.07 | 0.12 |
| 3C/0.33 C (%) | 73 | 78 | 83 | 85 | 82 | 78 | 77 |
| Life (%) | 70 | 85 | 92 | 95 | 91 | 91 | 91 |
| c (Å) | 14.2379 | 14.2390 | 14.2410 | 14.2426 | 14.2429 | 14.2398 | 14.2380 |
| FWHM (°) | 0.191 | 0.199 | 0.185 | 0.175 | 0.164 | 0.163 | 0.17 |

As can be seen from Table 1, the Examples 1 to 3 according to the present invention simultaneously show a lifespan characteristic of 90% or more and a rate capability of 80% or more, whereas Comparative Example 1 in which no fluoro compound is added and Comparative Examples 2 to 4 which are out of the range of adding the fluoro compound fail to satisfy two characteristics or one characteristic.

What is claimed is:
1. A cathode active material comprising:
   a lithium-excess lithium metal composite including monoclinic $Li_2MnO_3$ having a layered structure and rhombohedral $LiMO_2$, wherein M is one or more of Ni, Co, or Mn, and
   a fluoro compound,
   wherein an FWHM (half value width) value is within a range from 0.164 degree to 0.185 degree, wherein the lithium-excess lithium metal composite is represented by Formula $Li_{1+\alpha}Ni_xCo_yMn_zO_2$, wherein $0.1<\alpha\leq1$ and $0<x+y+z\leq1$, wherein the lithium-excess metal composite comprises $Li_2MnO_3$ in an amount of 20% or more, wherein a length of the c-axis in the cathode active material is within a range from 14.241 Å to 14.2429 Å.

2. The cathode active material of claim 1, wherein the fluoro compound is one selected from the group consisting of LiF, NaF, KF, $MgF_2$, $CaF_2$, $CuF_2$, $CdF_2$, $FeF_2$, $MnF_2$, $MgF_2$, $NiF_2$, $PbF_2$, $SnF_2$, $SrF_2$, $XeF_2$, $ZnF_2$, $AlF_3$, $BF_3$, $BiF_3$, $CeF_3$, $CrF_3$, $FeF_3$, $InF_3$, $LaF_3$, $MnF_3$, $NdF_3$, $VOF_3$, $YF_3$, $CeF_4$, $GeF_4$, $HfF_4$, $SiF_4$, $SnF_4$, $TiF_4$, $VF_4$, $ZrF_4$, $VF_5$, $NbF_5$, $SbF_5$, $TaF_5$, $BiF_5$, $MoF_6$, $ReF_6$, $SF_6$, $WF_6$, $NH_4F$, or a mixture thereof.

3. A method for preparing a cathode active material comprising a lithium-excess lithium metal composite including monoclinic $Li_2MnO_3$ having a layered structure and rhombohedral $LiMO_2$, wherein M is one or more of Ni, Co, or Mn, wherein the lithium-excess lithium metal composite is represented by Formula $Li_{1+\alpha}Ni_xCo_yMn_zO_2$, wherein $0.1<\alpha\leq1$ and $0<x+y+z\leq1$, wherein an FWHM (half value width) value of the cathode active material is within a range from 0.164 degree to 0.185 degree and a length of the c-axis in the cathode active material is within a range from 14.241 Å to 14.2429 Å, the method comprising:

synthesizing a transition metal hydroxide, the transition metal hydroxide being represented by Formula $Ni_aCo_b$-$Mn_c(OH)_2$, wherein $0<a<0.4$, $0<b\leq0.7$, $0<c\leq0.7$, $a+b+c=1$, and $a<b$; and mixing the transition metal hydroxide, a lithium supply source, and a fluoro compound, and then subjecting the mixture to heat treatment at 800° C. or less, wherein the amount of the fluoro is 0.02 to 0.06 mol per 2.0 mol of a total of the transition metal hydroxide and the lithium supply source.

4. The method of claim 3, wherein the heat treatment is performed at 700° C.

5. The method of claim 3, wherein the fluoro is one selected from the group consisting of LiF, NaF, KF, $MgF_2$, $CaF_2$, $CuF_2$, $CdF_2$, $FeF_2$, $MrIF_2$, $MgF_2$, $NiF_2$, $PbF_2$, $SnF_2$, $SrF_2$, $XeF_2$, $ZnF_2$, AlF3, $BF_3$, $BiF_3$, $CeF_3$, $CrF_3$, $FeF_3$, $InF_3$, $LaF_3$, $MnF_3$, $NdF_3$, $VOF_3$, $YF_3$, $CeF_4$, $GeF_4$, $HfF_4$, $SiF_4$, $SnF_4$, $TiF_4$, $VF_4$, $ZrF_4$, $VF_s$, $NbF_5$, $SbF_5$, $TaF_3$, $BiF_5$, $MoF_6$, $ReF_6$, $SF_6$, $WF_6$, $NH_4F$, or a mixture thereof.

6. The method of claim 3, wherein the fluoro compound is LiF and the lithium supply source is $Li_2CO_3$.

7. The method of claim 3, wherein the transition metal hydroxide is synthesized at a pH from 10 to 12.

8. A lithium secondary battery comprising:
a cathode comprising the cathode active material of claim 1;
an anode comprising an anode active material; and
an electrolyte present between the cathode and the anode.

* * * * *